US009367876B2

(12) United States Patent
Spencer et al.

(10) Patent No.: US 9,367,876 B2
(45) Date of Patent: Jun. 14, 2016

(54) SYSTEMS AND METHODS FOR MULTIMEDIA MULTIPOINT REAL-TIME CONFERENCING ALLOWING REAL-TIME BANDWIDTH MANAGEMENT AND PRIORITIZED MEDIA DISTRIBUTION

(75) Inventors: Barry Spencer, Falmouth, ME (US); Jeremy Egenberger, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 404 days.

(21) Appl. No.: 12/885,479

(22) Filed: Sep. 18, 2010

(65) Prior Publication Data

US 2011/0072366 A1    Mar. 24, 2011

Related U.S. Application Data

(60) Provisional application No. 61/243,923, filed on Sep. 18, 2009.

(51) Int. Cl.
| G06F 17/22 | (2006.01) |
| G06Q 40/04 | (2012.01) |
| H04L 12/18 | (2006.01) |
| G06F 17/24 | (2006.01) |
| H04L 12/58 | (2006.01) |

(52) U.S. Cl.
CPC ............ *G06Q 40/04* (2013.01); *H04L 12/1818* (2013.01); *H04L 12/588* (2013.01)

(58) Field of Classification Search
USPC ......................................................... 715/234
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |

(Continued)

*Primary Examiner* — James J Debrow

(74) *Attorney, Agent, or Firm* — Blakely, Sokoloff, Taylor & Zafman

(57) ABSTRACT

A system is disclosed for multimedia multipoint real-time conferencing that includes a communication module to receive a request to share media content in a virtual room setting. The content may include an audio, a video, a text, or a HyperText Markup Language (HTML) code referencing a third-party resource. The system may further include a content encoder at the host website to create a data packet encapsulating the transport characteristics and the routing requirements and a multipoint router to share the content via the transport protocol in the real-time group conference associated with the users of the virtual room.

15 Claims, 21 Drawing Sheets

(56) References Cited

U.S. PATENT DOCUMENTS

| | | | |
|---|---|---|---|
| 6,336,137 | B1 | 1/2002 | Lee et al. |
| 6,343,313 | B1* | 1/2002 | Salesky ............... G06F 3/1415 709/203 |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,789,105 | B2* | 9/2004 | Ludwig ............... G06Q 10/10 709/204 |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,242,389 | B1* | 7/2007 | Stern ............................ 345/158 |
| 7,340,411 | B2 | 3/2008 | Cook |
| 7,478,129 | B1* | 1/2009 | Chemtob .................... 709/204 |
| 7,620,655 | B2 | 11/2009 | Larsson et al. |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0152102 | A1 | 10/2002 | Brodersen et al. |
| 2002/0161734 | A1 | 10/2002 | Stauber et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachadran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0088545 | A1 | 5/2003 | Subramaniam et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0191743 | A1 | 10/2003 | Brodersen et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2007/0083592 | A1* | 4/2007 | Bartram et al. ............... 709/204 |
| 2007/0250705 | A1* | 10/2007 | Smith et al. .................... 713/157 |
| 2009/0019367 | A1* | 1/2009 | Cavagnari et al. ............ 715/716 |
| 2010/0138746 | A1* | 6/2010 | Zarom ........................ 715/720 |
| 2010/0251142 | A1* | 9/2010 | Geppert et al. ............... 715/758 |
| 2010/0268694 | A1* | 10/2010 | Denoue et al. ................ 707/693 |
| 2010/0332304 | A1* | 12/2010 | Higgins et al. ............. 705/14.16 |
| 2014/0244407 | A1* | 8/2014 | Brown et al. .............. 705/14.73 |

* cited by examiner

SYSTEMS AND METHODS FOR MULTIMEDIA MULTIPOINT REAL-TIME CONFERENCING ALLOWING REAL-TIME BANDWIDTH MANAGEMENT AND PRIORITIZED MEDIA DISTRIBUTION

CROSS-REFERENCE TO RELATED APPLICATIONS

This nonprovisional patent application claims the priority benefit of U.S. Provisional Application Ser. No. 61/243,923, filed on Sep. 18, 2009, titled "Multi-Channel Real-Time Conferencing," which is hereby incorporated by reference in its entirety.

FIELD OF THE INVENTION

This application relates generally to data processing and more specifically to systems and methods for multimedia multipoint real-time conferencing.

BACKGROUND

Online communities have become a supplemental form of communication between people. Many means are used in social network software separately or in combination, including text-based chat rooms and forums that use voice, video, text, or avatars. Some means facilitate conferencing between online users ranging from real-time online chat over instant messaging and online forums to fully immersive graphical social environments. Existing technologies may allow users to share ideas, activities, events, and interests within their individual networks. However, none of the existing technologies allows users to share content in a multimedia multipoint real-time conferencing session.

SUMMARY OF THE INVENTION

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In an exemplary embodiment, a system for multimedia multipoint real-time conferencing may include a communication module to receive, via a transport protocol, from a client embedded in a host website, a request to share content in a real-time group conference associated with users of a virtual room within a host website. The request may be associated with routing requirements and transport characteristics. The system may further include a content encoder to create a data packet encapsulating the routing requirements and the transport characteristics. A multipoint router may be utilized to share the content via the transport protocol in the real-time group conference associated with the users of the virtual room.

The host website may include one or more instructions stored in memory or software scripts to facilitate the embedded client, with the one or more software scripts being specific to the host website. The host website may include one or more of the following: a social networking website, a blog, and a dating website. The transport characteristics may include one or more of the following: prioritization, media scaling, caching, addressing, synchronization, sequencing, and redundancy. The content may include one or more of the following: audio, video, text, and HyperText Markup Language (HTML) code. The HTML code may reference a third-party resource.

In an exemplary embodiment, the system may comprise an HTML creator to create response HTML code, wherein the response HTML code is shared via the transport protocol in the real-time group conference to enable viewing of media associated with a third-party resource. The response data packet may include implicit and explicit recommendations associated with the content. The virtual room within the host website may be based on a fan room and automatically customized based on settings associated with the fan room.

In further exemplary embodiments, steps of methods counterpart to the systems described herein may be stored on a computer readable storage medium having a program embodied thereon, with the program executable by a processor in a computing device. In yet further exemplary embodiments, modules, subsystems, or devices can be adapted to perform the recited steps. Other features and exemplary embodiments are described below.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION

A multipoint, real-time, collaborative communication and media sharing system comprising a multimedia real-time multipoint conferencing service and software clients is disclosed. In some exemplary embodiments, the system is a first real-time communication service that allows groups of people to collaboratively experience and enjoy libraries of rich media content in personalized rooms, on fan pages, and on websites.

The system may be used for real-time group communication and as a sharing platform configurable for integration with social networks, allowing real-time bandwidth management and prioritized media distribution. The system may be used to promote and merchandize products through implicit and explicit recommendations via real-time communication and sharing services or the software. Additionally, the system may allow the sharing of context-related advertisements in a real-time group video conference.

In addition to providing real-time video conferencing capabilities, the system may improve usability for a group video conference by optionally substituting an avatar image for live image from camera. An interactive one-step testing technique may be used to improve audio quality for audio conferencing. Thus, the system for multimedia multipoint real-time conferencing may provide a new dimension to the experience of social networks, allowing people to communicate and share content, in real-time.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
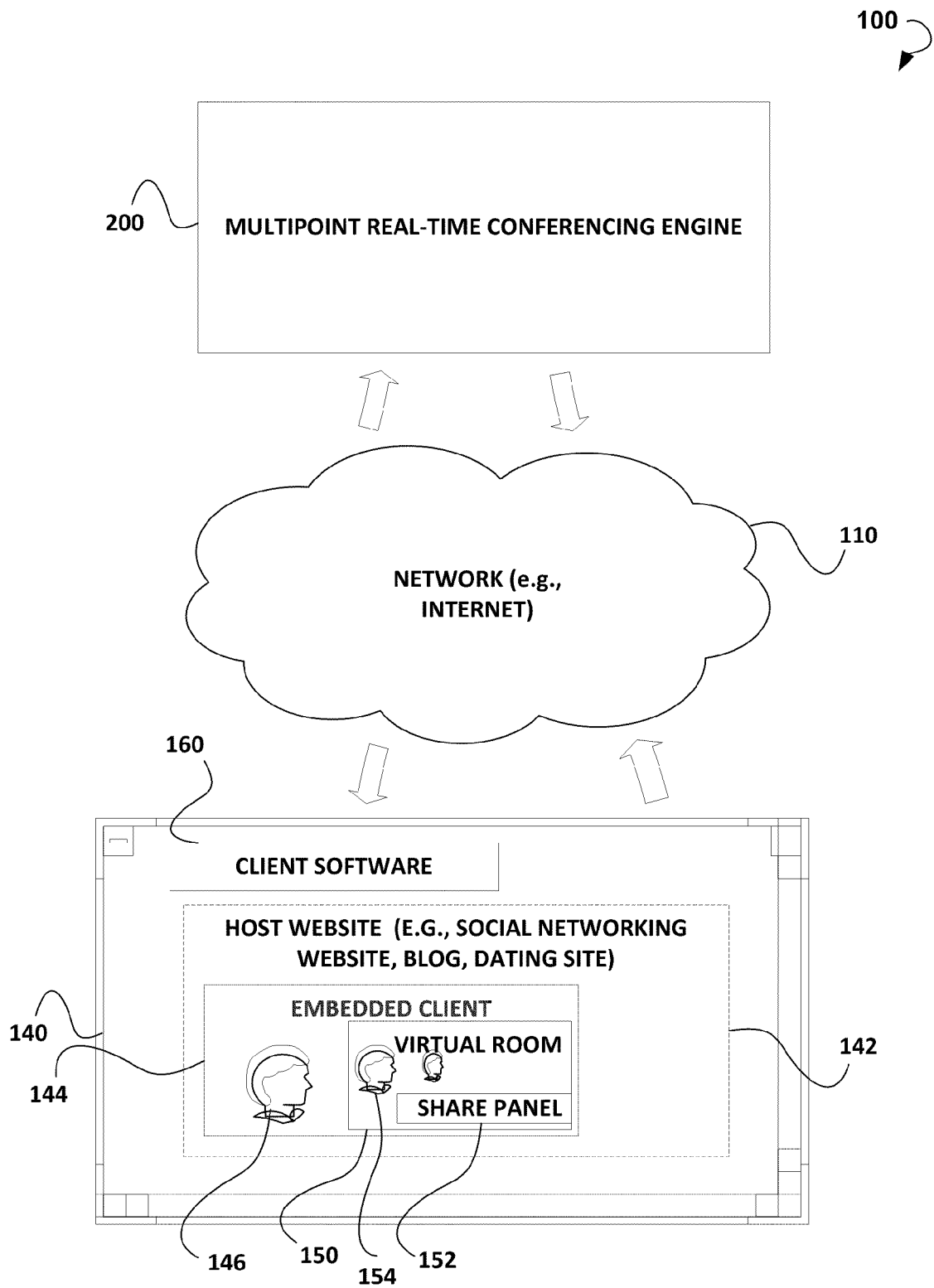
FIG. 1 is a block diagram of a network environment within which systems and methods for multipoint real-time conferencing are implemented.

FIG. 1 is a block diagram of a network environment 100 within which systems and methods for multimedia multipoint real-time conferencing are implemented, in accordance with an exemplary embodiment. As shown in FIG. 1, the network environment 100 may include a user interface 140, a multipoint real-time conferencing engine 200, and a network (e.g., the Internet) 110.

The network 110 may include data processing nodes interconnected for the purpose of data communication and may communicatively couple various depicted modules such as the user interface 140 and the multipoint conferencing engine 200. The user interface 140 may be utilized by a user 146 to access an embedded client 144. The embedded client 144 may include a virtual room 150, allowing the user 146 to share content with community users 154.

The virtual room 150 within the embedded client 144 may be based on a fan room and as such, the virtual room 150 may be automatically customized based on settings associated with the fan room. For example, where the host website 142 is a social networking service, the social networking service may have user-generated fan pages for various topics. The fan pages may correspond to the target locations for the social networking service functionality.

The embedded client 144 may include client software 160 (e.g., JavaScript and plugins). The client software 160 may facilitate the embedded client 144 and be specifically developed for the host website 142. The client software 160 is described in more detail with reference to FIG. 3 below.

The user 146 and the community users 154 may be connected to the multipoint real-time conferencing engine 200 via individual embedded clients 144. The embedded client 144 may be embedded in the host website 142 (e.g., a social networking website, a blog, and a dating website).

Figure 2:
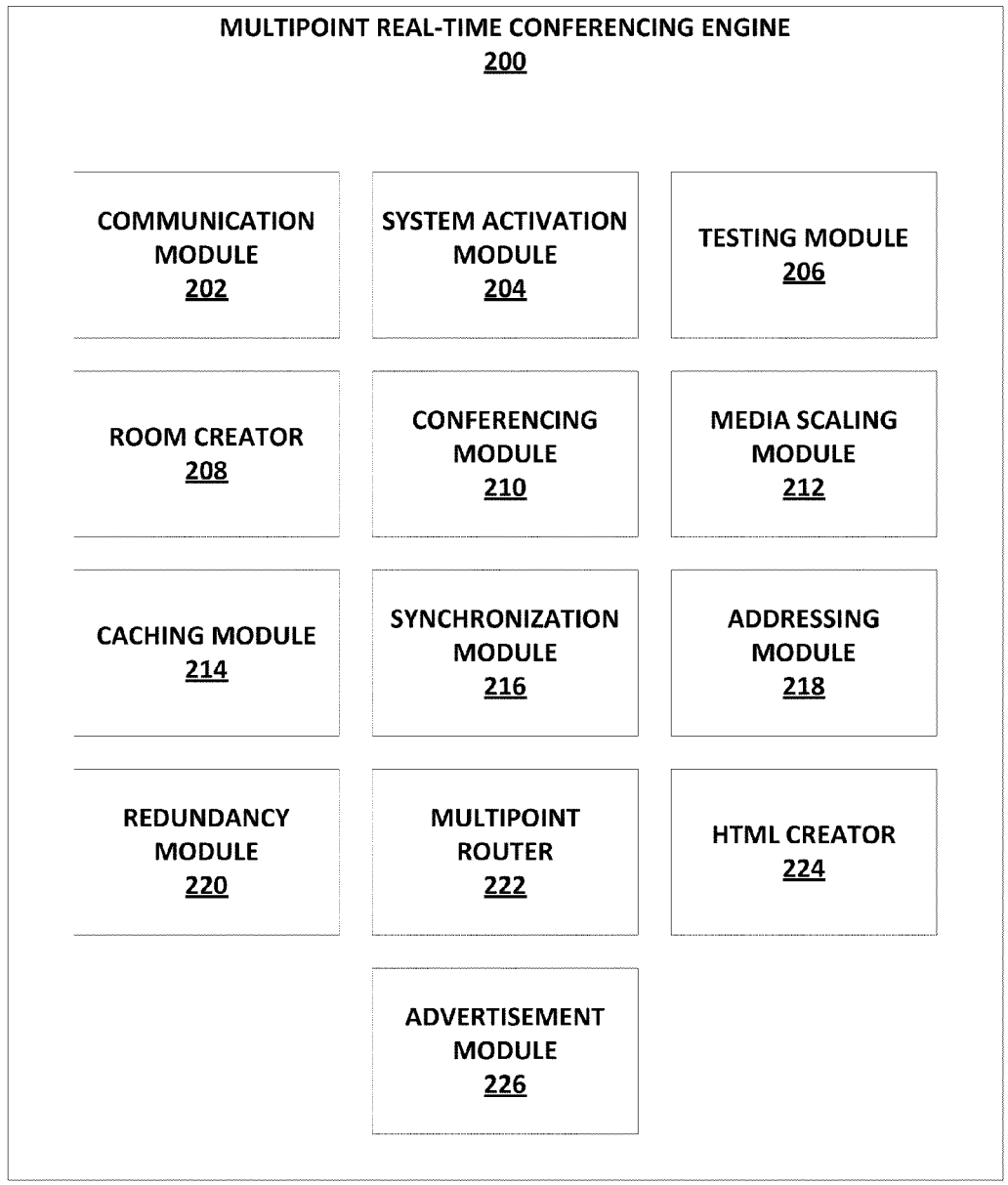
FIG. 2 is a block diagram of a multipoint real-time conferencing engine.

FIG. 2 is a block diagram of the multipoint real-time conferencing engine 200, in accordance with an exemplary embodiment. Alternative embodiments of the multipoint real-time conferencing engine 200 may comprise more, less, or functionally equivalent modules. In some exemplary embodiments, the multipoint real-time conferencing engine 200 may comprise a communication module 202, a system activation module 204, a testing module 206, a room creator 208, a conferencing module 210, a media scaling module 212, a caching module 214, a synchronization module 216, an addressing module 218, a redundancy module 220, a multipoint router 222, an HTML creator 224, and an advertisement module 226.

It will be appreciated by one of ordinary skill that examples of the foregoing modules may be virtual, and instructions said to be executed by a module may, in fact, be retrieved and executed by a processor. The foregoing modules may also include memory cards, servers, and/or computer discs. Although various modules may be configured to perform some or all of the various steps described herein, fewer or more modules may be provided and still fall within the scope of various embodiments.

The multipoint real-time conferencing engine 200 may provide intelligent multipoint routing of real-time data, encompassing a variety of selectable transport characteristics. These characteristics may include prioritization, media scaling, caching, addressing, synchronization, sequencing, and redundancy. The characteristics may be encoded as tags within a stream of packets, with each packet describing its own routing requirements.

The multimedia multipoint real-time conferencing engine 200 may allow users to share and experience a wide variety of media types. The multipoint real-time conferencing engine 200 may be configured to support shared webcam video, shared audio from microphones, shared text chat, shared audio streams from local audio files (MP3, for example), shared audio and video streams from movie files, shared pictures from files, or shared HTML.

For example, the user 146 shown in FIG. 1 may wish to share content by dragging and dropping the file onto a share panel 152. The content may include an audio, a video, a text, or a reference to a third party content represented by an HTML code. The shared HTML code may reference any number of sources of data from other websites. For example, the user 146 may choose to share a YouTube video. In response, multipoint real-time conferencing engine 200 creates HTML code which encapsulates the selected content for playback. In other words, the reference to the selected content may be shared via HTML. The HTML code may be shared with all of the community users 154, thereby enabling one user to show other users a particular video of interest. HTML sharing may be used for sharing videos, music, and photos from online services, such as iMeem. The system may also enable sharing of products for sale, live events (concerts, for example), movie trailers, and so forth.

The client software 160 may encode the characteristics associated with the content in tags and the routing requirements in a data packet. Each packet may be sent using a transport protocol (e.g., TCP and SSL) via the network 110 to the multipoint real-time conferencing engine 200.

A communication module 202 of the multipoint real-time conferencing engine 200 may receive, via the transport protocol, the packet including a request to share the content in a real-time group conference associated with the community users 154 of the virtual room 150. As already mentioned above, the request may be associated with routing requirements and transport characteristics. A multipoint router 222 may be utilized to share the content via the transport protocol in the real-time group conference associated with the users of the virtual room 150.

If the data packet includes an HTML code referencing third-party content, the HTML creator 224 may be utilized to create response HTML code, with the response HTML code shared via the transport protocol in the real-time group conference to enable viewing of media associated with the third-party resource. The response data packet, which may include the HTML code, may include implicit and explicit recommendations associated with the content.

The multipoint real-time conferencing engine 200 may facilitate creation of virtual rooms, which parallel fan rooms provided by the host website 142. A fan room may facilitate multi-media communications between fans for a particular fan page and allow users of the host website 142 to meet other fans with a shared interest or find new friends who share a common interest.

The synchronization module 220 may automatically synchronize the virtual room 150 of the embedded client 144 with a fan room of the host website 142. The result is that for each fan page on the host website 142, there may be a corresponding virtual room 150 supported by the multipoint real-time conferencing engine 200. A virtual room 150 based on a fan room may be automatically configured by the synchronization module 220 to reflect the style and personality of the corresponding fan page. This configuration process may leverage profile information and photos from the corresponding fan page.

When the user 146 is in the virtual room 150 based on a fan room, the multipoint real-time conferencing engine 200 may provide the user 146 with the ability to choose and share video or image content associated with the corresponding fan room directly from the virtual room 150. If the user 146 chooses to share an image from the virtual room 150, that image may be automatically rendered for the community users 154 in the virtual room 150. If the user 146 chooses to share a video from the virtual room 150, the video may be automatically played (streamed from the user system) to the community users 154 in the virtual room 150.

The multipoint real-time conferencing engine 200 may provide signaling and call status functionalities for the host website 142, thus providing a key integration point between the embedded client 144 and the host website 142. The signaling and call status functionalities may permit the host website users to call each other using various example techniques and monitor the status of calls that are currently taking place.

For example, one host website user may invite another host website user to a new or existing call by sending them a link using an instant messenger embedded in the host website 142. In another example, a host website user may invite another host website user to a new or existing call by sending them a link to a signaling system. This communication may be made secure using existing secure protocols.

The multipoint real-time conferencing engine 200 may present a list of ongoing calls to the user 146 in a "now happening list." This list may contain both active virtual rooms 150 based on fan rooms (rooms associated with fan pages) as well as active user rooms (private rooms that are associated with host website user accounts).

The system activation module 204 may be used to activate the system used with an appropriate online social networking site. A system plug-in may be downloaded from that host website 142. The system may be activated through commands embedded in the host website 142. For example, in the context of a Facebook-oriented application, a Facebook account may be required. The user 146 may register for Facebook at www.facebook.com. The plug-in, in turn, may be downloaded from an address associated with the Facebook social network (such as http://apps.facebook.com/zorapapp) and which may further include instructions for the installation of the plug-in.

The testing module 206 may allow for testing the system after its deployment. For example, a "Ding" test may be utilized in the context of the presently disclosed communication system for testing audio settings. The first time the system is used after installation, the user may be prompted to run the "Ding" test. The system has a built-in echo reduction feature, which eliminates audio echo. The "Ding" test tests for echo in the audio setup. The user may remain quiet and reduce background noise as much as possible for the duration of the test. If a user fails the "Ding" test, the system will continue to prompt the user to run the "Ding" test until the system passes the test.

There are several actions that a user may take to reduce or eliminate echo in the audio setup. The user may turn down the volume of the speakers or move the microphone away from the speakers and closer to the user's mouth. The user may use a headset with a microphone. The headphones of the headset eliminate sound feedback to the microphone. If a headset is not available, a user may activate the "Push to Talk" feature of the system, which mutes the speakers while the user is talking.

For each type of sharable content, the system may execute a simultaneous display of advertisements for either (a) the product, which is represented by the content, or (b) products and services, which are related to the content. In this manner, the system may leverage personal recommendations, which may be either explicit ("hey, you should buy this") or implied ("hey, this is something I like").

Figure 3:
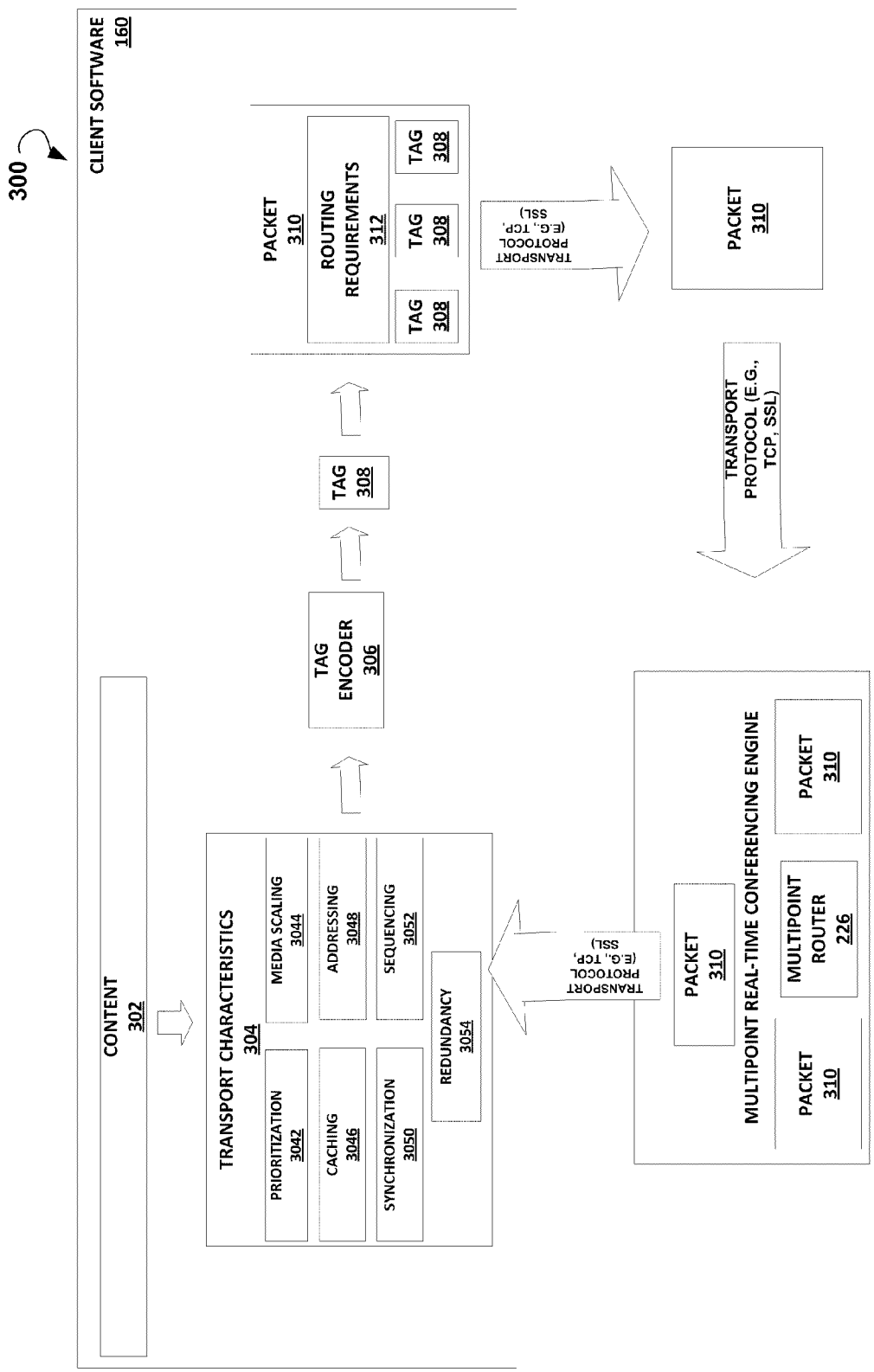
FIG. 3 is a workflow diagram of a method for sharing content via the multipoint real-time conferencing engine.

FIG. 3 is a workflow diagram of a method 300 for sharing content, in accordance with an exemplary embodiment. The method 300 may be performed by processing logic that may comprise hardware (e.g., dedicated logic, programmable logic, microcode, etc.), software (such as run on a general-purpose computer system or a dedicated machine), or a combination of both. In one exemplary embodiment, the processing logic resides at the multipoint real-time conferencing engine 200, as illustrated in FIG. 2.

As show in FIG. 3, the method 300 may be facilitated by the client software 160 and may commence with the user 146 requesting to share content via the share panel 152 of the virtual room 150. The content may include a webcam video, audio streams from local audio files like MP3, audio and video streams from movie files, pictures from files, and HTML code. A tag encoder 306 may be utilized to create one or more tags 308, which may be encapsulated by a packet 310 along with routing requirements 312 (e.g., as a header of the data packet).

The tags 308 may be based on the transport characteristics 304, which in turn may be based on a type of the content 302. The transport characteristics 304 may include one or more of the following characteristics: a prioritization 3042, a media scaling 3044, a caching 3046, an addressing 3048, a synchronization 3050, a sequencing 3052, and a redundancy 3054.

The packet 310, including the routing requirements 312 and the one or more tags 308, may be transported to the multipoint real-time conferencing engine 200 using overlapped TCP and/or SSL transport. The multipoint real-time conferencing engine 200 may respond to TCP and/or SSL requests by returning similarly encoded data.

Hardware requirements for the system may vary with the application and the host website 142. An Internet connection with sufficient bandwidth for sharing rich media (such as audio and video) may be preferred, such as presently, for example, 384 kbps inbound and 256 kbps outbound. In an implementation with a slower Internet connection, and depending on the number of participants in a session, performance degradation may be experienced in the form of reduced video performance or delays when receiving shared content.

The system may be compatible with multiple browsers, including, but not limited to, Internet Explorer, Firefox, and AOL Explorer on Windows XP, Vista, and 7. In the Macintosh environment, the system may support Safari, Firefox, and iOS.

For photos, the system may support JPG, BMP, GIF, and PNG formats. Supported music formats may include MP3 and WMA on Windows and QuickTime on a Macintosh. Supported video formats may include WMV on Windows and a variety of QuickTime video formats on a Macintosh.

Figure 4:
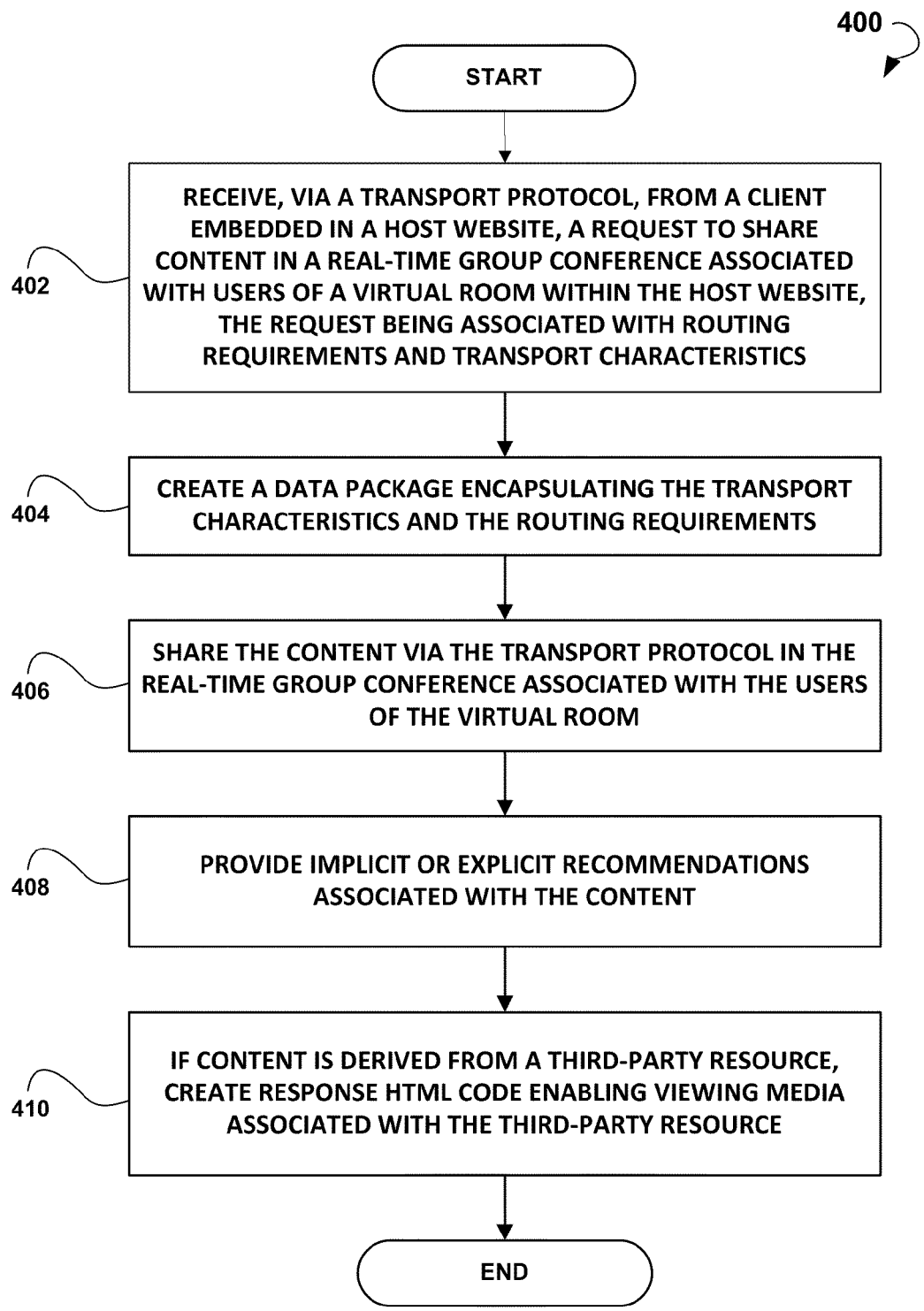
FIG. 4 is a workflow diagram of a method for multimedia multipoint real-time conferencing.

FIG. 4 is a workflow diagram of a method 400 for multimedia multipoint real-time conferencing, in accordance with an exemplary embodiment. The method 400 may be performed by processing logic that may comprise hardware (e.g., dedicated logic, programmable logic, microcode, etc.), software (such as run on a general-purpose computer system or a dedicated machine), or a combination of both. In one exemplary embodiment, the processing logic resides at the multipoint real-time conferencing engine 200, as illustrated in FIG. 2.

The method 400 may be performed by the various modules discussed above with reference to FIG. 2. Each of these modules may comprise processing logic. The method 400 may commence at operation 402, with the communication module 202 receiving from the embedded client 144 a request to share content in a real-time group conference associated with users of the virtual room 150. The request may be associated with the routing requirements 312 and the transport characteristics 304.

At operation 404, the client software 160 may create a data packet with the routing requirements 312 and the transport characteristics 304. At operation 406, the multipoint real-time conferencing engine 200 may share the content via the transport protocol in the real-time group conference associated with the users of the virtual room. At operation 408, the advertisement module 226 may provide implicit or explicit recommendations associated with the content. If the referenced content comes from a third-party resource, at operation 410, the HTML creator 224 may create a response HTML code enabling viewing media associated with the third party resource.

Figure 5:
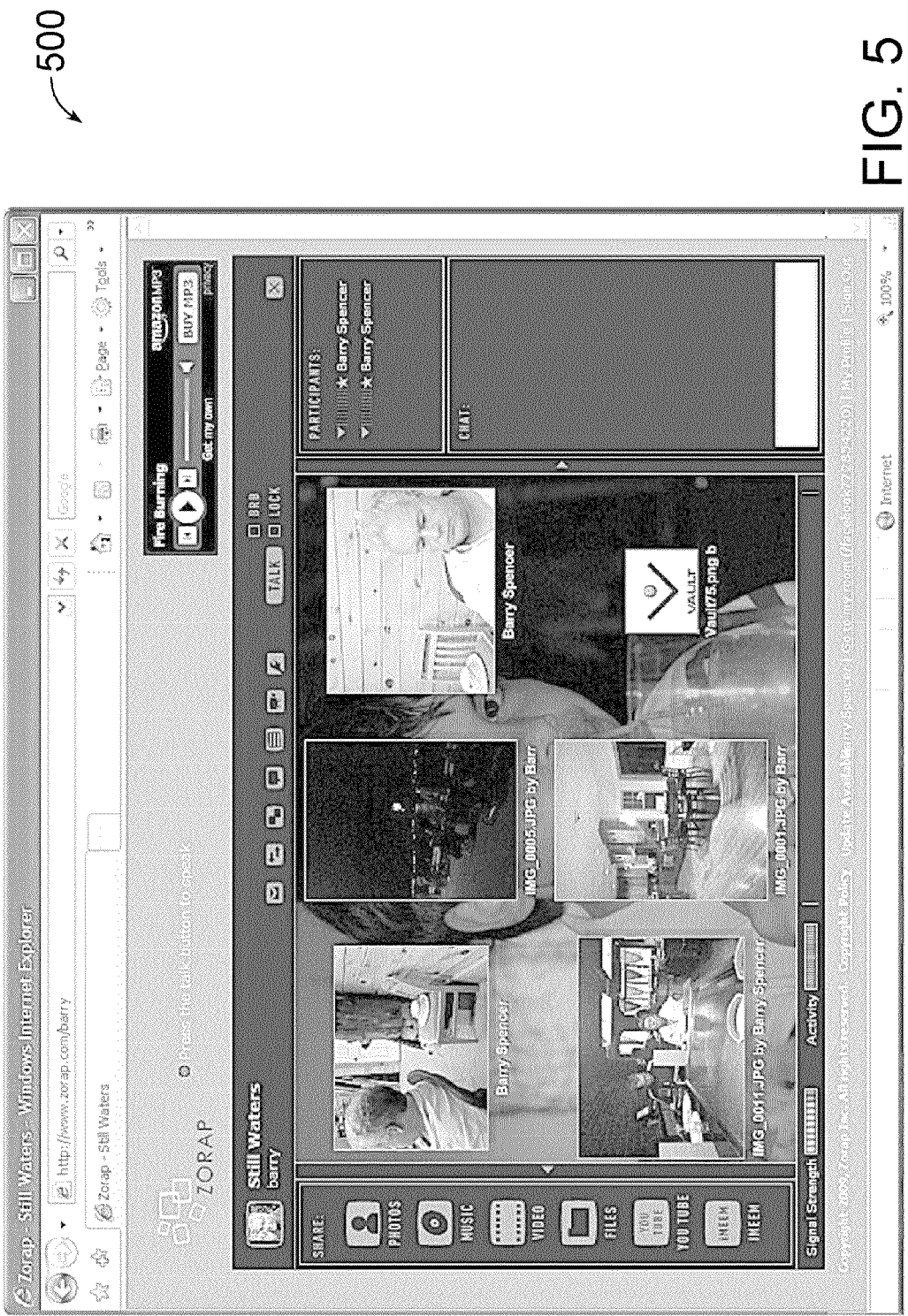
FIG. 5 is a screen shot of a session in progress.

FIG. 5 is a screen shot 500 of a session in progress, in accordance with an exemplary embodiment. To create the virtual room 150, the user 146 may access the system at the host website 142. In a social networking website example, the user 146 may access the components for operating the system at the social networking website. In some exemplary embodiments, merely accessing the host website 142 at a predetermined Universal Resource Locator (URL) address while logged into a host website account may cause the virtual room 150 to be created. The user 146 may designate a specific topic for the virtual room 150. If the user 146 does not specify a topic, a default mode may be initiated. The user 146 may choose which of his host website friends to invite when he or she initiates the session.

The user 146 may choose one of multiple security levels for the virtual room 150. If the user 146 chooses to make the virtual room 150 private, only those community users 154 who are on an invitation list created by the user 146 may join the virtual room 150. The user 146 may also choose a security level of "Allow Friends of Friends." If this level is selected, then the user's friends may invite their friends to also join the virtual room 150. With the available security settings, chat and share functions may provide a safe environment for social interaction on the Internet. Only people invited by the user 146 may join the virtual room 150, or, if the user 146 chooses that security setting friends of friends as described above, then the friends of invited users 154 can also join the virtual room 150.

To publicize a session, the friends who are invited when the virtual room 150 is initiated may receive a notification when the session begins. If the user 146 does not choose the "Private" security level, the session may also be posted to a public site, such as a news feed associated with the host website 142. The posted message may tell the designated friends about the session and the topic of the session (if one has been chosen). If someone tries to join the session after it is over, they may receive the error message "Sorry, the room you were invited to is no longer open."

If the user 146 changes his friends list, an uninvited person may try to join a session in progress. If a person invited to a previous session has not been included in a current friends list, then they may receive the error message "Sorry, you are no longer allowed to enter that room." Generally, people will not receive information about sessions they are not invited to. The security level of a session may be such that it cannot be changed after the session has been initiated. The security level may be set when the virtual room 150 is created. However, additional people from the user's friends list may be invited to a session after the session has begun.

A person may join a session by simply clicking on the notification for that session. If an invitee has received a posting on a news feed about a session, the invitee may only need to click on text that might state, "Click here to join." Persons wishing to join a session may check a "Happening Now" list on a system application window to see the sessions hosted their friends. If there is an open session, the name will be underlined and the person can click on the name to join.

The "Happening Now" list may display the names of friends who are also using the virtual room 150. The list may include a user's friends' names, the state of each room, the last topic, and the friends' profile pictures. There may be at least five possible states: Closed, Private, Full, Invited, or Public. If the session is not closed, the list may also display how many people are in the room. Since sessions may typically be limited to 50 participants, if a session is full, a person may not enter until someone has exited. The user who establishes the room may use moderator features to block or eject unwanted visitors.

If the user is the owner of a room, the user may be considered the moderator and the only one with access to the moderator features. The moderator features may be accessed by either right-clicking (ctrl-click on a Macintosh) on a person's picture or on the triangle to the left of their name in the participant list. The moderator menu may provide options to control the size and location of windows, manage shared items in a session, and block or eject people. Moderator privileges may also be transferred to other session participants through the moderator menu.

Items may be shared in a session by clicking on any of the icons in the share panel 152 of the embedded client 144. The share panel 152 may be shown on the left hand side of the screen when a session is in progress. The icons may present dialog containing items of the type represented by the icon. Selecting the item to be shared may cause it to appear in the session. Items may be shared by dragging and dropping from a user's desktop, provided the items are in a format supported by the system.

Shared items may be removed or resized by the system during a session. In one embodiment of the system, the user 146 may position his mouse in the upper right hand corner of an item to cause two boxes to be displayed. The left, empty box may toggle between growing and shrinking the window.

The right box, with an "x" inside, may close the window. The context menu for an item may be opened by right-clicking (ctrl-click on the Macintosh) and choosing "resize" or "close" from the menu. Migration of the session items may be inhibited by opening the context menu by right-clicking (ctrl-click on the Macintosh) on the item and choosing "Pin" from the menu. A slide show may be created by selecting multiple pictures from the "Share photos" dialog. Icons will appear at the bottom of the window to facilitate scrolling through the pictures.

The system may utilize a drag, drop and share feature. The user 146 may drag one or more files onto the share panel 152, and the file or files are automatically shared with all of the other community users 154. "Share" may be defined based on the type of media. Photos are reduced in size for transmission, and initially, a very low-resolution image may be sent. This may then be followed by a higher resolution image. The result may be that the selected image is quickly put onto the session screen, and then the quality of the image is improved. In contrast, music and movie files are reformatted or transcoded (decompressed and then recompressed) to a lower-bandwidth format which is appropriate for most internet connections. Then, the compressed stream may be transmitted in real-time to everyone in the virtual room 150. For music and movie files, activating a Share function may play the selected item for the group. Other types of "office" files may be sent intact to everyone else, similar to a one-to-many file transfer. The transferred files may be represented as icons on the receiving end and may be opened for local viewing, editing, or storing.

The system may include many other functions and options to enable and enhance the social sharing experience. The following listing is a non-exhaustive list and is not meant to be inclusive of all available functions or options. The system may use other activation means for the underlying functions.

In one exemplary embodiment, there may be five default panes in a room window. On the left hand side, the user may see the Share pane; the icons in this pane may be used to share photos, music, video, and files. In the specific examples of sharing You Tube and iMeem content, session information, the button bar, and other session controls may be located across the top of the virtual room 150. The name of the virtual room 150 and a moderator associated with the virtual room 150 may appear on the left.

In the center is the button bar; more information about each button may be provided under the heading "What do the buttons at the top of the session window do?" There may be a control to set "Be Right Back" ("BRB"), which may let people know you will return to the room shortly. Underneath the BRB control, the user 146 may click the "Lock" checkbox if they want Talk to always be on. If the user 146 does not lock talk, the user may need to hold down the "Talk" button whenever the user wants to speak in the room. This push-to-talk feature may be similar to that used on a walkie-talkie.

If the user 146 is in a virtual room 150 that they own or moderate, "Customize Room" may appear to the right of the lock setting. Clicking on "Customize Room" may bring up a dialog to customize the colors of elements in the room. On the right hand side may be an "X." Clicking on the "X" may result in exiting the session and the user 146 may no longer be in the virtual room 150.

On the right hand side of the screen, the pane at the top may contain a list of session participants. The user 146 may right-click (control click on the Macintosh) for different options for each participant. The pane on the bottom right may be the chat window. The user 146 may click in a white section to type in text. If the user 146 clicks on a wrench in the button bar, the settings panel may replace the right two sections. The center of the virtual room 150 may contain the session participants and the items they are sharing.

Settings in the setting panel may include "Webcam" to allow the use of a web camera if there is more than one device connected to the user computer. "Microphone" may be used to select a microphone. The "Recording level" setting may default to auto. The user 146 may deselect auto if the user 146 would like to manually control the recording level. The "Volume meter" may provide user feedback on the volume level at the user's location. The user 146 may use the volume meter to test their microphone. If the volume meter is active when the user 146 is not talking, there may be too much background noise at the user's location. The "push-to-talk" feature may be recommended in this case.

"Audio Output" may be used to select the user's playback device, and "Playback Level" may be used to set the volume of the user's playback. The "Click to Test" button may perform the "Ding" test and determine if the user's configuration is causing echo. Beneath the test button may be a visual feedback on the user's echo levels as well as the status of the user's echo test. Clicking the "Close" button at the bottom of the settings panel may hide the settings panel.

The BRB checkbox may deactivate the user's web camera and microphone and tell people that the user is taking a short break. If the user is using a camera and the user's live image was projected into the session, the user's video image will be replaced by the user's social networking profile picture. The user 146 may no longer be heard in the room, though the user will still be able to hear (more quietly) what is going on in the room.

A "Press the talk button to speak" alert message may be displayed any time Chat and Share senses that the user is speaking and the user's microphone is disabled. This can occur if the user has the "BRB" button checked or the "LOCK" unchecked and the user does not press the "TALK" button.

The first button in a series at the top of a session window, starting from the left, is an envelope or "INVITE." When this button is pressed, it may bring up a list of the user's friends and invite other people to join the session. The second button with the left and right facing arrows is "SHARE." This button may be pressed to open and close the share pane. The third button, "CHAT," may open and close the chat pane. The fourth icon, the camera, may toggle the state of the camera and may read either "TURN CAMERA ON" or "TURN CAMERA OFF" depending on the current state of the camera. The fourth button, the wrench, is "SETTINGS." This button may be pressed to open and close the settings pane.

The "Signal Strength" indicator may relate to the quality and reliability of a connection. The "Activity" indicator may be similar to signal strength; if the activity meter is not moving smoothly from left to right, the user may lose data or have intermittent Internet connection problems.

Context menus may be available by right clicking (control clicking on the Macintosh) on various elements in the system interface. An example list of some context menu commands and their meanings may include "Close" (close this window) and "Maximize" (maximize the window display). The user 146 may also maximize a window by clicking on it once. "Restore" may restore a window to normal size. The user 146 may restore a maximized window by clicking it once. "Pin" may disable the auto size and auto arrange functionality for a particular window. The default may be to automatically arrange.

"Grow" may cause a window to occupy four times as much screen space as other windows. Only one window may have "Grow" enabled at a time. Enabling "Grow" for a window may disable the feature on other windows. "Shrink" may undo "Grow." "GrowForAll" may grow a particular window for all the participants in a call. This command may only be available to the moderator. The "GrowForAll" command may be useful when the user 146 wishes to highlight specific content. "ShrinkForAll" may undo GrowForAll.

"Open" may be used to open a Microsoft Office file. "Save" may be used to save a shared file or photo to the local computer. "Snapshot" may be used to take a snapshot of a user's image. "Pause" may be used to pause a slideshow. "Play" may be used to resume a slideshow. "Previous" may be used with slideshows and to go back to the previous picture. "Next" may be used with slideshows and to go to the next picture. "Eject" may be used with user images (either profile photos or web cam images) to cause a user to be ejected from a call. This feature may only be available to the room moderator.

"Louder" may be used to increase the volume of a shared music file or shared video file (but not shared web content). This feature may only be available to the room moderator. "EnableVoice/DisableVoice" may enable or disable audio privileges for a particular user. This feature may only be available to the room moderator.

"EnableVideo/DisableVideo" may enable or disable web cam privileges for a particular user. This feature may only be available to the room moderator. "EnableSharing/DisableSharing" may enable or disable sharing privileges (that is, can this user share content?) for a particular user. This feature may only be available to the room moderator. "EnableModerating" may allow a room owner to allow someone else to "moderate" a particular session. This feature may only be available to the room moderator. Moderator privileges may be such that they cannot be revoked. Moderator privileges may expire after a session ends.

Some commands in the system may be available only to a select subset of users designated as "SUPERUSERS." One such command is "Promote," which may elevate another user to the "SUPERUSER" level. Another "SUPERUSER" command may be "Banish," which may permanently banish someone from the system.

"Block" may cause the system to stop sending or receiving audio/video/text or shared material from a particular user. "Unblock" may undo the Block command. "CameraOff" may turn off the web cam if it is on. "CameraOn" may turn on the web cam if it is off and connected.

"176×144" may only work on the user's own image and only when the web cam is on. This may require setting the camera resolution to 176×144. "320×240" may change the camera resolution to 320×240. This setting may only work on the user's own image when the web cam is on.

"Diagnostics" may allow entering a diagnostic mode and displaying diagnostic information. Diagnostics may be available by right clicking on the background. "EchoAudio" (only in diagnostic mode) may be available by right clicking on the background. This may allow the user to test their audio by echoing their voice. "EchoVideo" (only in diagnostic mode) may be similar to EchoAudio, but echoes the user's own video stream (webcam). "Dump" (only in diagnostic mode) may write a detailed log file to the user's computer. This file may contain up to five minutes of historical information. Support personnel may ask the user to submit one of these files if the user is having trouble with the system.

Figure 6:
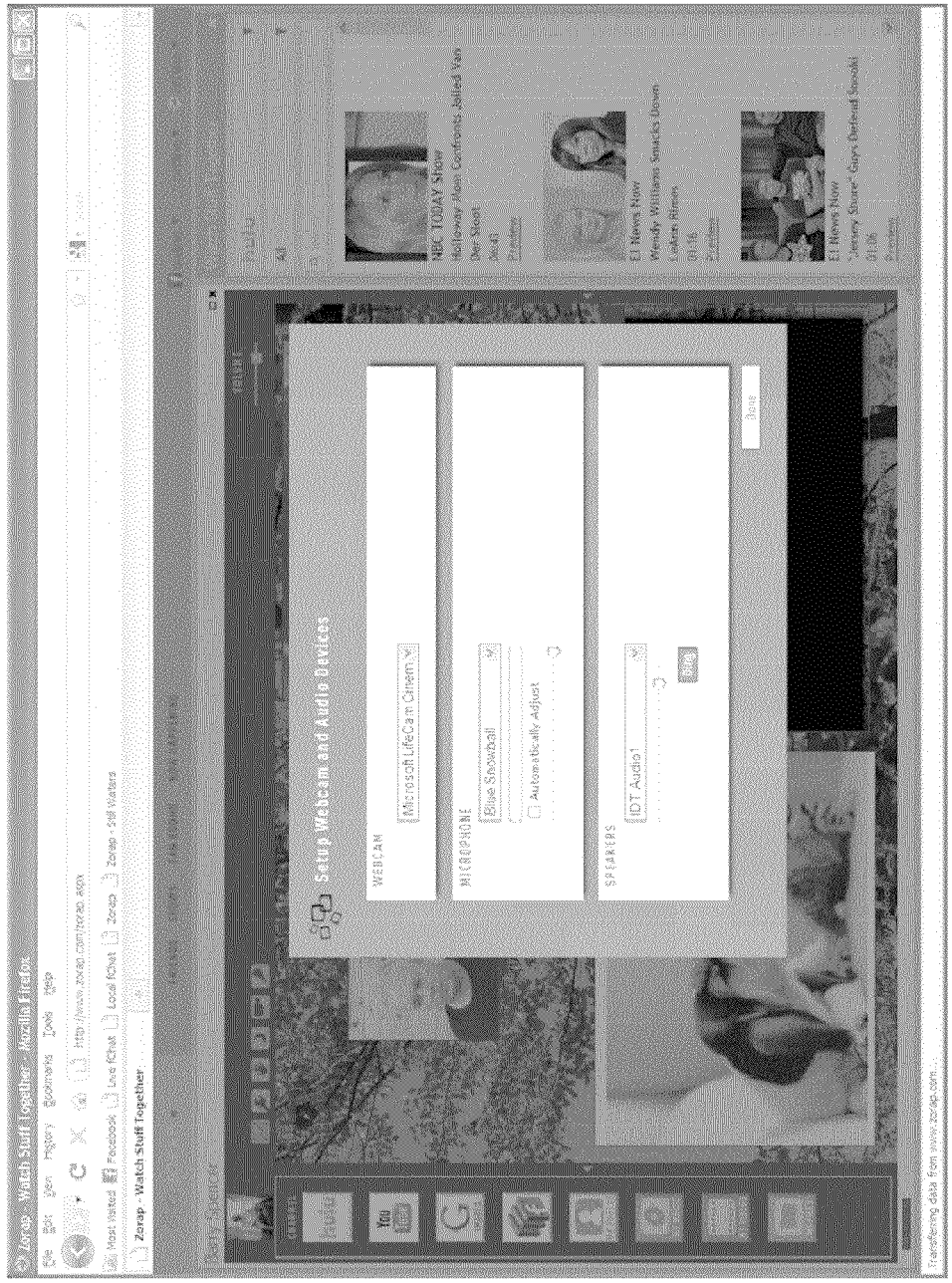
FIG. 6 is a screen shot of a session in progress.
Figure 7:
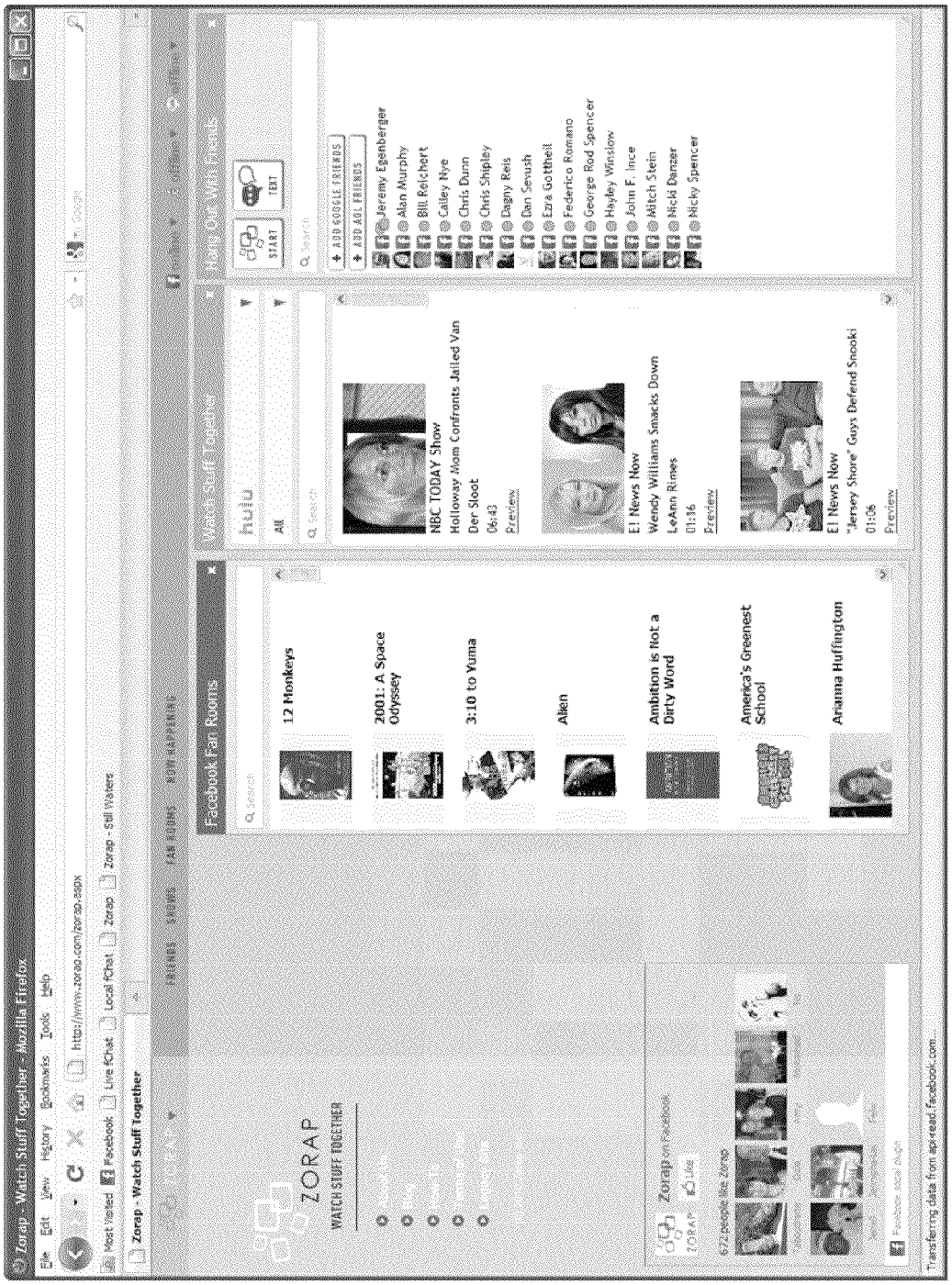
FIG. 7 is a screen shot of an invitation page.
Figure 8:
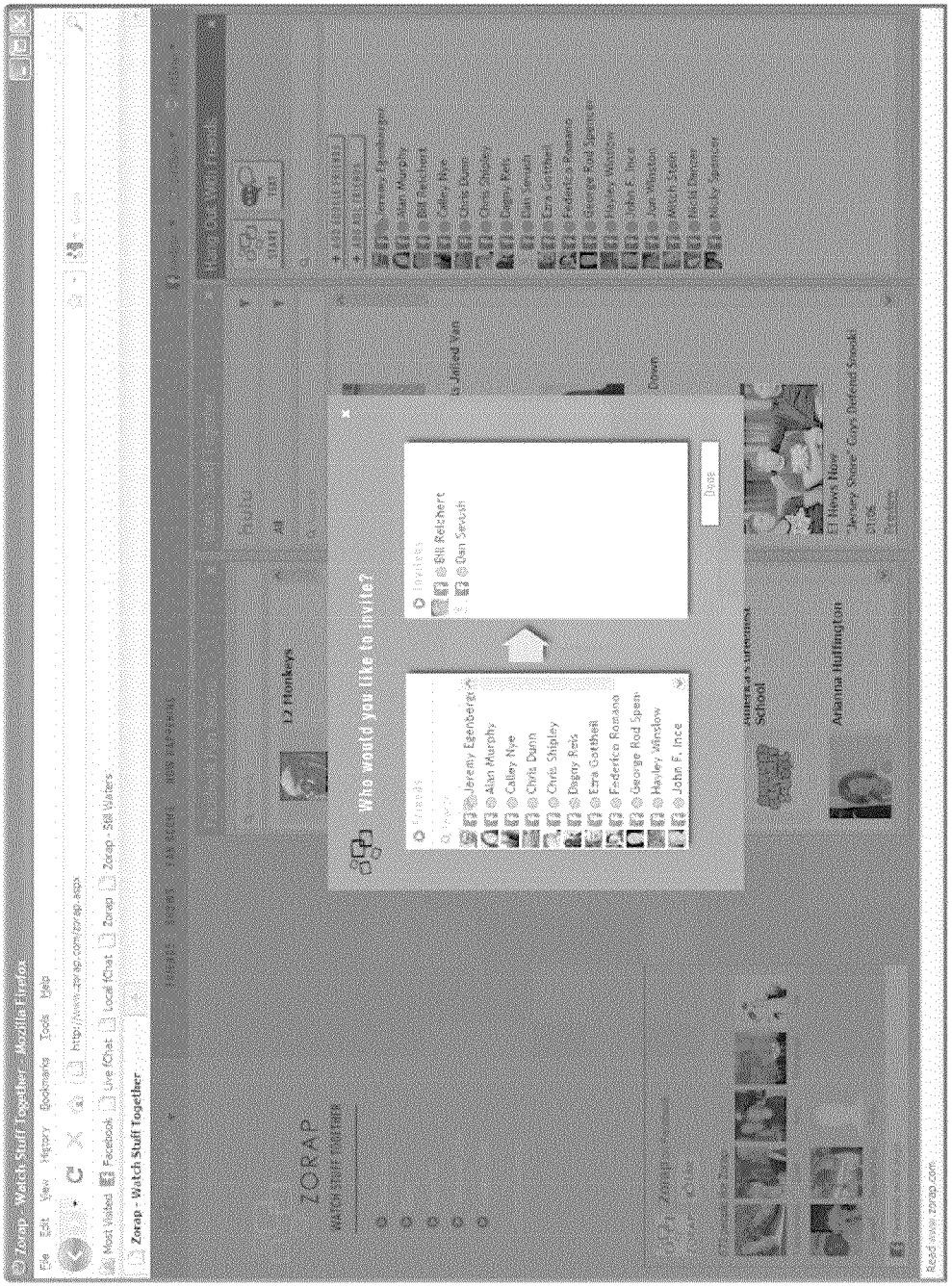
FIG. 8 is a screen shot of a closing page.
Figure 9:
FIG. 9 is a screen shot of an error message page.
Figure 10:
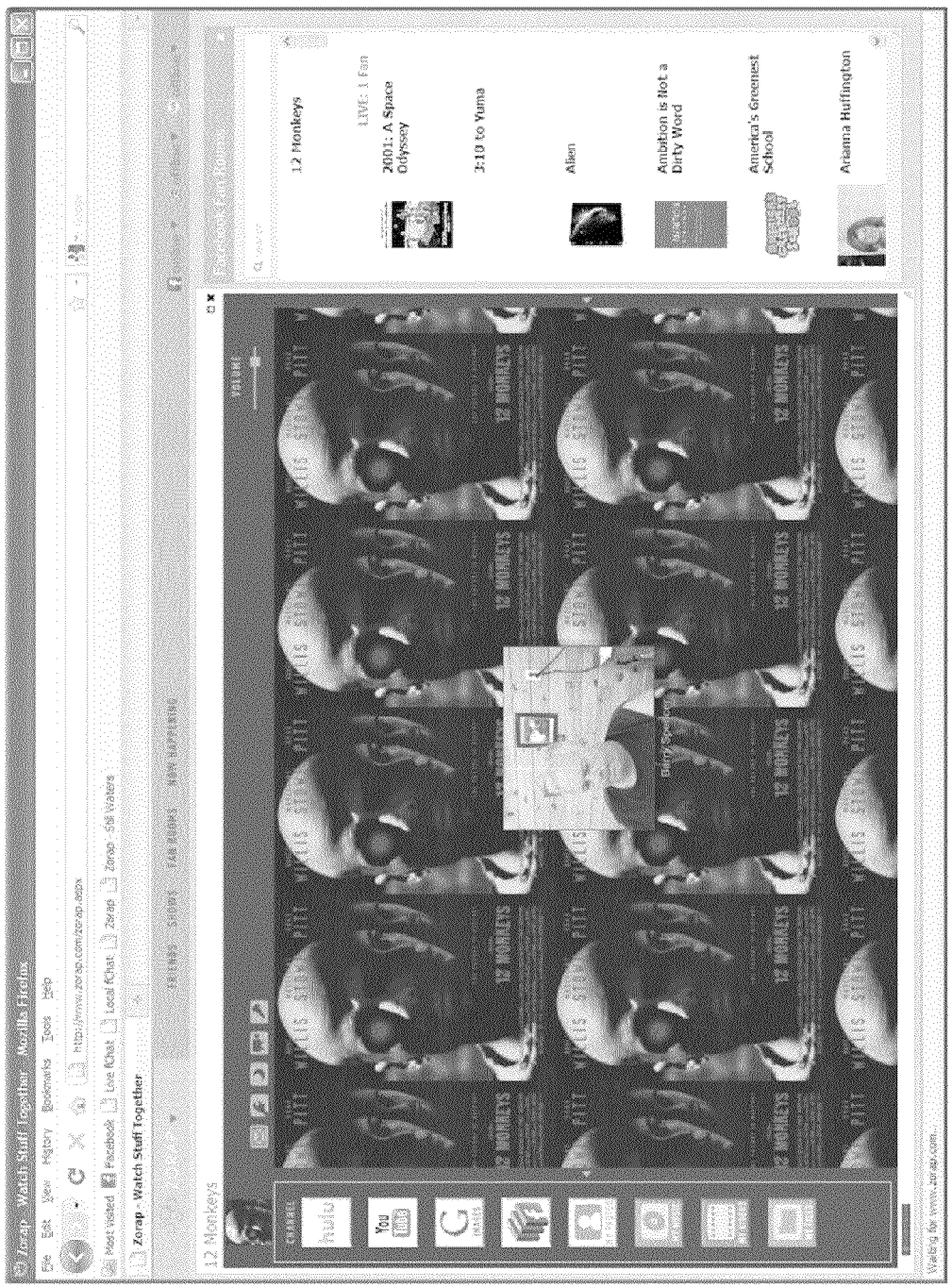
FIGS. 10-13 are screen shots of a starting page.
Figure 11:
Figure 12:
Figure 13:
Figure 14:
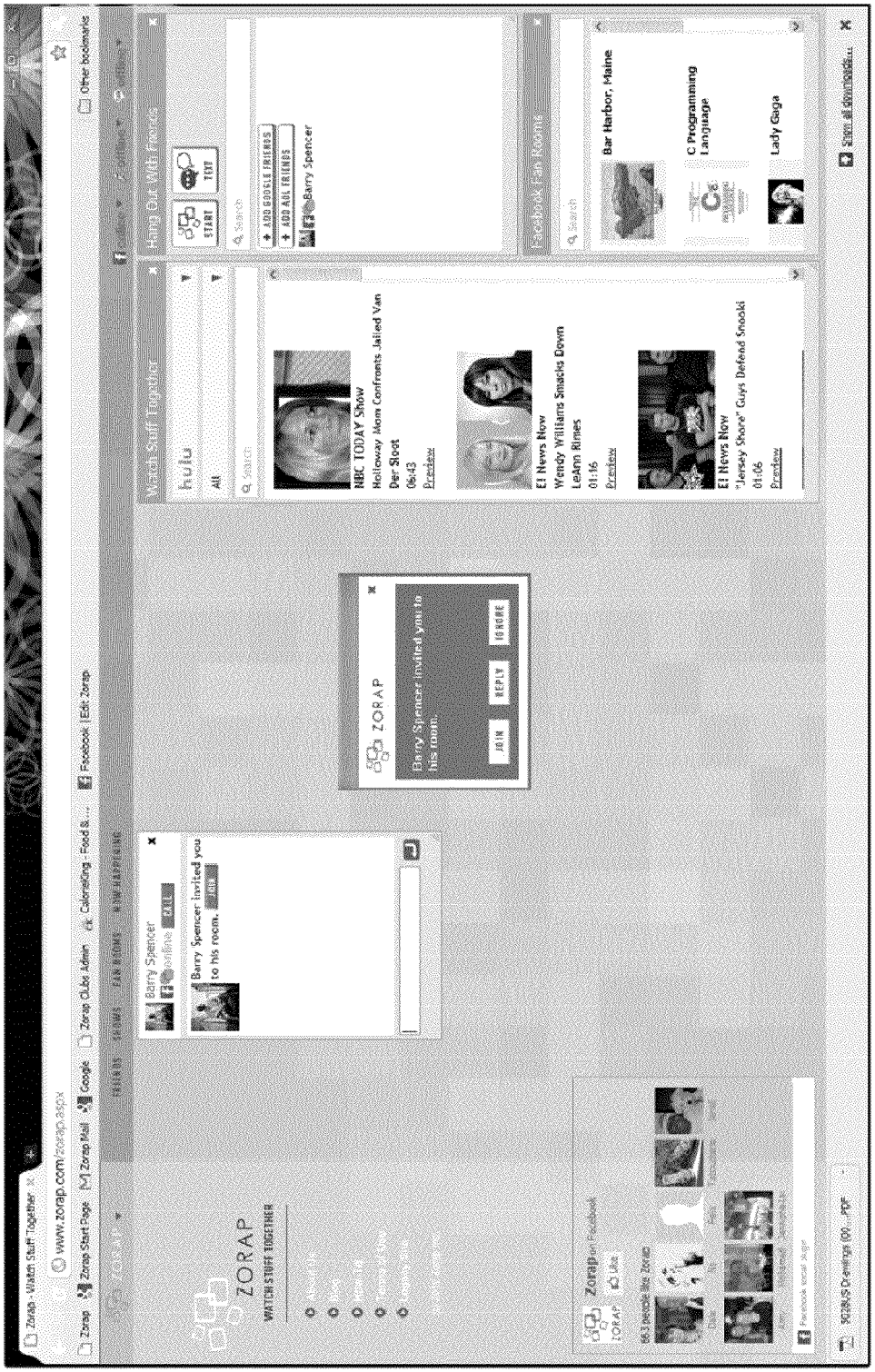
FIG. 14 is a screen shot of an invitation page.
Figure 15:
FIG. 15 is a screen shot of a closed room message page.
Figure 16:
FIG. 16 is a screen shot of a terms of use page.
Figure 17:
FIG. 17 is a screen shot of browser error message page.
Figure 18:
FIG. 18 is a screen shot of a topic notification page.
Figure 19:
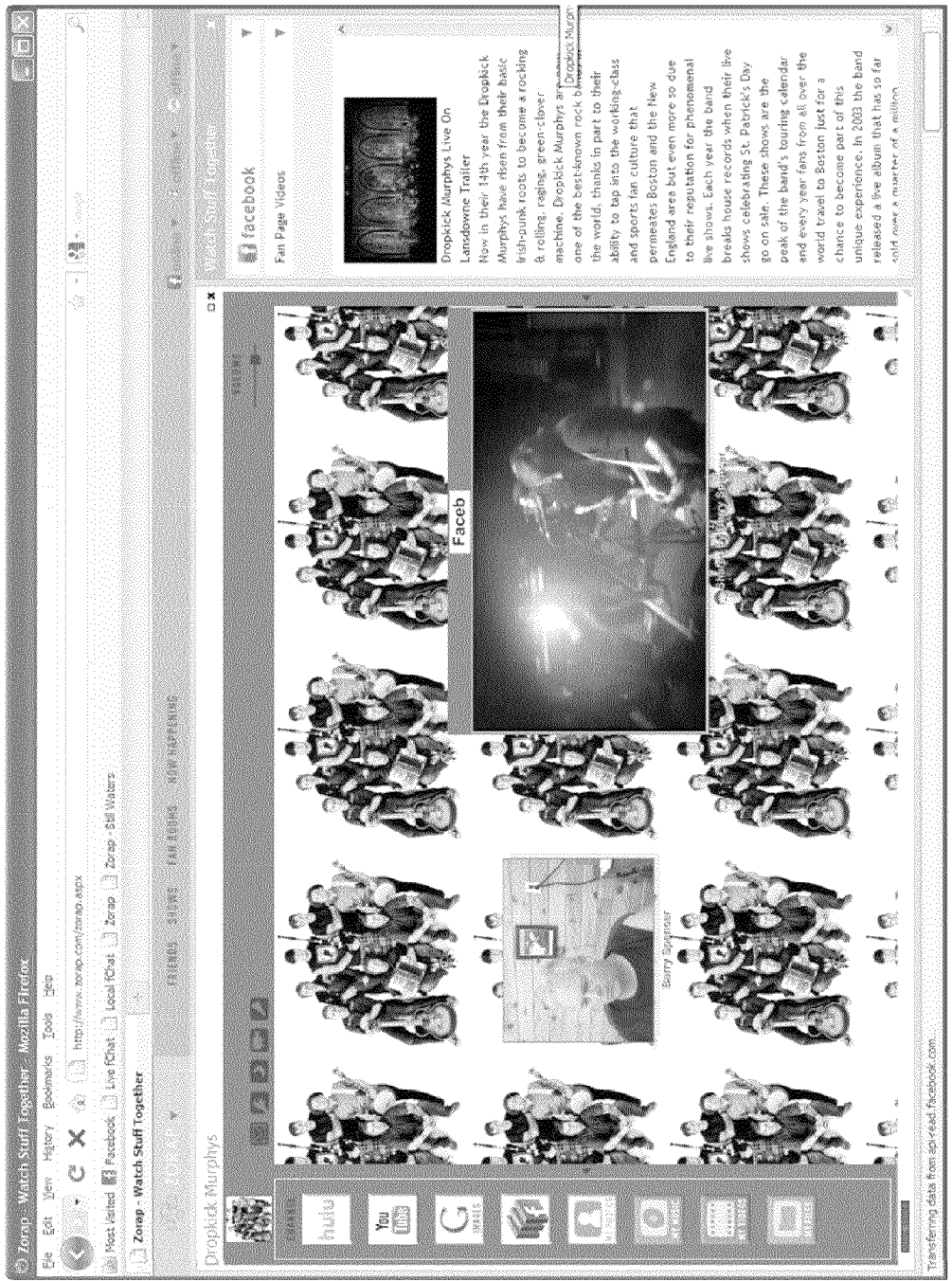
FIG. 19 is a screen shot of a session initiation page.
Figure 20:
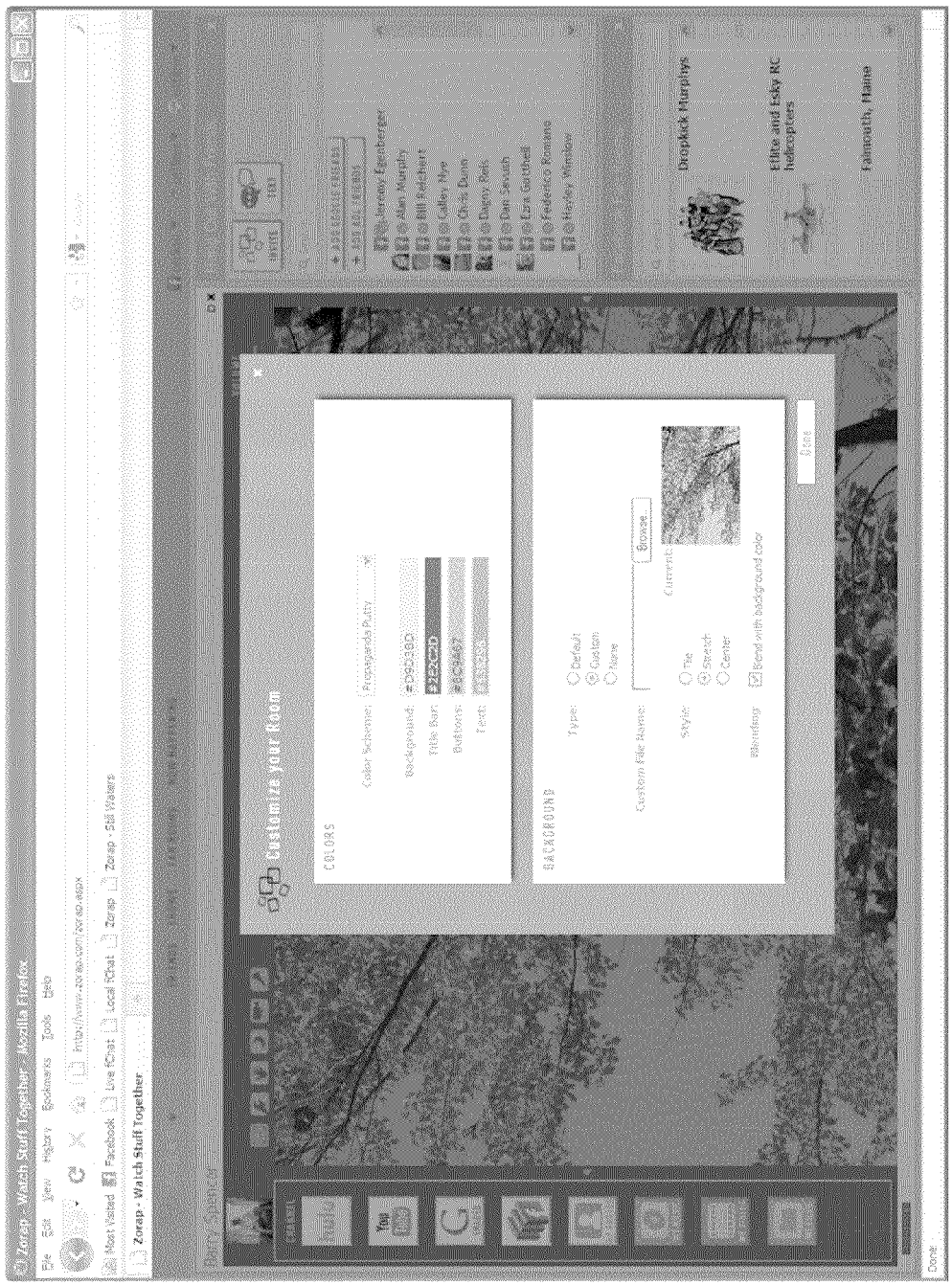
FIG. 20 is a screen shot of a session welcome page.

FIG. 6 is a screen shot 600 of a session in progress, in accordance with an exemplary embodiment. An exemplary system for multimedia multipoint real-time conferencing may include a function that facilitates online chat and sharing sessions. The system may be used in conjunction with existing online social networking sites. In one example, the system may be utilized with the social networking site Facebook. The system provides a unique, customizable, and private "virtual room" that may, in one exemplary embodiment, accommodate up to 50 people at the same time. A user and the friends of the user can chat using live audio, video, or text and also share music, pictures, video, and Internet content in real-time.

The system facilitates the sharing of music, photos, videos, slideshows, and Microsoft Office files. Web-based content, such as YouTube files and music videos from iMeem, may also be shared with the system. A user and the user's friends can view pictures or a video together and discuss the viewed items.

FIGS. 7-20 are exemplary screen shots of webpages which may be associated with some of the functions of the system, in accordance with various embodiments. Among the pages shown in FIGS. 7-20 are one or more of an invitation page, a closing page, an error message page, a starting page, a closed room message page, a terms of use page, a browser error message page, a topic notification page, a screen shot of a session initiation page, and a session welcome page.

Figure 21:
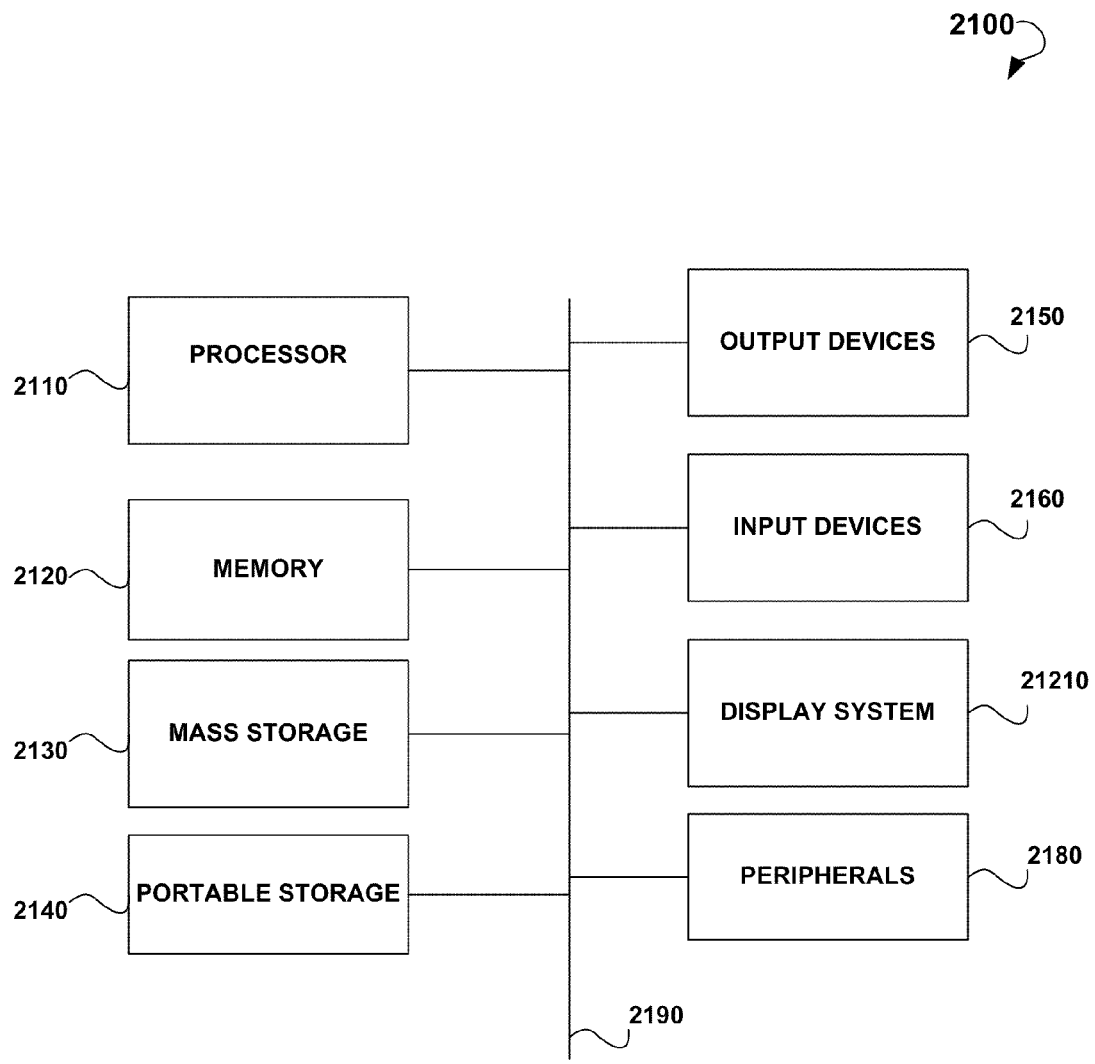
FIG. 21 is a computing system that may be used to implement the systems and methods of the present invention.

FIG. 21 illustrates an exemplary computing system 2100 that may be used to implement embodiments of the present invention. System 2100 of FIG. 21 may be implemented in the context of the user interface 140, the multipoint real-time conferencing engine 200, the network 110, and the like. The computing system 2100 of FIG. 21 includes one or more processors 2110 and main memory 2120. Main memory 2120 stores, in part, instructions and data for execution by processor 2110. Main memory 2120 can store the executable code when the system 2100 is in operation. The system 2100 of FIG. 21 may further include a mass storage device 2130, portable storage medium drive(s) 2140, output devices 2150, user input devices 2160, a display system 2170, and other peripheral devices 2180.

The components shown in FIG. 21 are depicted as being connected via a single bus 2190. The components may be connected through one or more data transport means. Processor 2110 and main memory 2120 may be connected via a local microprocessor bus, and the mass storage device 2130, peripheral device(s) 2180, portable storage medium drive 2140, and display system 2170 may be connected via one or more input/output (I/O) buses.

Mass storage device 2130, which may be implemented with a magnetic disk drive or an optical disk drive, is a non-volatile storage device for storing data and instructions for use by processor 2110. Mass storage device 2130 can store the system software for implementing embodiments of the present invention for purposes of loading that software into main memory 2120.

Portable storage medium drive 2140 operates in conjunction with a portable non-volatile storage medium, such as a floppy disk, compact disk (CD) or digital video disc (DVD), to input and output data and code to and from the computer system 2100 of FIG. 21. The system software for implementing embodiments of the present invention may be stored on such a portable medium and input to the computer system 2100 via the portable storage medium drive 2140.

User input devices 2160 provide a portion of a user interface. User input devices 2160 may include an alphanumeric keypad, such as a keyboard, for inputting alphanumeric and other information, or a pointing device, such as a mouse, a trackball, stylus, or cursor direction keys. Additionally, the system 2100 as shown in FIG. 21 includes output devices 2150. Suitable output devices include speakers, printers, network interfaces, and monitors.

Display system 2170 may include a liquid crystal display (LCD) or other suitable display device. Display system 2170 receives textual and graphical information and processes the information for output to the display device.

Peripherals 2180 may include any type of computer support device to add additional functionality to the computer system. Peripheral device(s) 2180 may include a modem or a router.

The components contained in the computer system 2100 of FIG. 21 are those typically found in computer systems that may be suitable for use with embodiments of the present invention and are intended to represent a broad category of such computer components that are well known in the art. Thus, the computer system 2100 of FIG. 21 can be a personal computer (PC), hand held computing device, telephone, mobile computing device, workstation, server, minicomputer, mainframe computer, or any other computing device. The computer can also include different bus configurations, networked platforms, multi-processor platforms, and so forth. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art. One skilled in the art will recognize that the Internet service may be configured to provide Internet access to one or more computing devices that are coupled to the Internet service, and that the computing devices may include one or more processors, buses, memory devices, display devices, I/O devices, and the like. Furthermore, those skilled in the art may appreciate that the Internet service may be coupled to one or more databases, repositories, servers, and the like, which may be utilized in order to implement any of the embodiments of the invention as described herein. One skilled in the art will further appreciate that the term "content" comprises one or more of web sites, domains, web pages, web addresses, hyperlinks, URLs, any text, pictures, and/or media (such as video, audio, and any combination of audio and video) provided or displayed on a web page, and any combination thereof.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes, or steps may be deleted, moved, added, subdivided, combined, and/or modified to provide alternative or subcombinations. Each of these processes or steps may be implemented in a variety of different ways. In addition, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the metes and bounds of the appended claims.

What is claimed is:

1. A method for multimedia multipoint real-time conferencing, the method comprising:
    receiving, from a client embedded in a host website, a request to share content from a third-party resource in a real-time group conference associated with users of a virtual room provided by a multipoint real-time conferencing engine within the host website, the request being encapsulated in a data packet with tags associated with the content and routing requirements describing one or more recipients of the content, wherein the content includes at least Markup Language code referencing the third-party resource;
    based on the tags and the routing requirements, sharing the content from the third-party resource in the real-time group conference with the users of the virtual room; and
    creating a response code, wherein the content is shared via a transport protocol in the real-time group conference to enable viewing of media from the third-party resource by the users.

2. The method of claim 1, wherein the host website includes one or more instructions stored in memory to facilitate the embedded client, the one or more instructions being specific to the host website.

3. The method of claim 1, wherein the host website is one or more of the following: a social networking website, a blog, and a dating website.

4. The method of claim 1, wherein transport characteristics include one or more of the following: a prioritization, a media scaling, a caching, an addressing, a synchronization, a sequencing, and a redundancy.

5. The method of claim 1, wherein a response data packet includes implicit and explicit recommendations associated with the content.

6. A system for multimedia multipoint real-time conferencing, the system comprising:
   a communication module to receive, via a transport protocol, from a client embedded in a host website, a request to share content from a third-party resource in a real-time group conference associated with users of a virtual room within the host website having a multipoint real-time conferencing engine, wherein a client software creates a packet encapsulating tags describing the content and routing requirements and transport characteristics, wherein the content includes at least Markup Language code referencing the third-party resource, and creating an creator to create response code, wherein the response code is shared as a part of the content via the transport protocol in the real-time group conference to enable viewing of media from the third-party resource by the users; and
   a multipoint router to share the third-party content via the transport protocol in the real-time group conference associated with the users of the virtual room.

7. The system of claim 6, wherein the host website includes one or more instructions stored in memory to facilitate the embedded client, the one or more instructions being specific to the host website.

8. The system of claim 6, wherein the host website is one or more of the following: a social networking website, a blog, and a dating website.

9. The system of claim 6, wherein transport characteristics include one or more of the following: prioritization, media scaling, caching, addressing, synchronization, sequencing, and redundancy.

10. The system of claim 6, wherein a response data packet includes implicit and explicit recommendations associated with the content.

11. A non-transitory computer readable storage medium having a program embodied thereon, the program executable by a processor in a computing device to perform a multimedia multipoint real-time conferencing method, the method comprising:
    receiving, from a client embedded in a host website, a request to share content from a third-party resource in a real-time group conference associated with users of a virtual room provided by a multipoint real-time conferencing engine within the host website, the request being encapsulated in a data packet with tags associated with the content and routing requirements describing one or more recipients of the content, wherein the content includes at least Markup Language code referencing the third-party resource;
    based on the tags and the routing requirements, sharing the content from the third-party resource in the real-time group conference with the users of the virtual room; and
    creating a response code, wherein the content is shared via a transport protocol in the real-time group conference to enable viewing of media from the third-party resource by the users.

12. The non-transitory computer-readable medium of claim 11, wherein the host website includes one or more instructions stored in memory to facilitate the embedded client, the one or more instructions being specific to the host website.

13. The non-transitory computer-readable medium of claim 11, wherein the host website is one or more of the following: a social networking website, a blog, and a dating website.

14. The non-transitory computer-readable medium of claim 11, wherein transport characteristics include one or more of the following: a prioritization, a media scaling, a caching, an addressing, a synchronization, a sequencing, and a redundancy.

15. The non-transitory computer-readable medium of claim 11, wherein a response data packet includes implicit and explicit recommendations associated with the content.

* * * * *